United States Patent
Turner

(10) Patent No.: US 11,561,918 B1
(45) Date of Patent: Jan. 24, 2023

(54) COMMUNICATION BUS RECOVERY BASED ON MAXIMUM ALLOWABLE TRANSACTION DURATION

(71) Applicant: Amazon Technologies, Inc., Reno, NV (US)

(72) Inventor: Nicholas Turner, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 16/874,933

(22) Filed: May 15, 2020

(51) Int. Cl.
*G06F 13/40* (2006.01)
*G06F 13/42* (2006.01)

(52) U.S. Cl.
CPC ...... *G06F 13/4022* (2013.01); *G06F 13/4282* (2013.01); *G06F 2213/0016* (2013.01)

(58) Field of Classification Search
CPC ............ G06F 13/4022; G06F 13/4282; G06F 2213/0016
USPC ............................ 710/6, 15, 31, 33, 51, 316
See application file for complete search history.

(56) References Cited

U.S. PATENT DOCUMENTS

| | | | | |
|---|---|---|---|---|
| 4,718,059 A * | 1/1988 | Zwaga | .................... | G08B 25/10 370/458 |
| 6,330,647 B1 * | 12/2001 | Jeddeloh | ............... | G06F 13/161 710/40 |
| 6,681,256 B1 * | 1/2004 | Kuntze | ............. | H04W 74/0866 370/280 |
| 2002/0083244 A1 * | 6/2002 | Hammarlund | ...... | G06F 12/0857 710/107 |
| 2003/0210685 A1 * | 11/2003 | Foster | ................... | H04L 49/356 370/389 |
| 2004/0193737 A1 * | 9/2004 | Huffman | ............... | G06F 3/0689 710/1 |
| 2007/0011381 A1 * | 1/2007 | Ishida | .................... | G06F 13/364 710/116 |
| 2008/0034140 A1 * | 2/2008 | Kai | ........................ | G06F 13/364 710/119 |
| 2008/0256727 A1 * | 10/2008 | Van Der Meijden | ........................ | E04H 4/1663 15/1.7 |
| 2010/0329118 A1 * | 12/2010 | Adams | .................. | H04L 47/762 370/235 |
| 2011/0013772 A1 * | 1/2011 | Roethig | ............. | H04N 21/4367 380/200 |
| 2012/0079054 A1 * | 3/2012 | Moroney | ......... | H04N 21/41265 709/213 |

(Continued)

*Primary Examiner* — Idriss N Alrobaye
*Assistant Examiner* — Henry W Yu
(74) *Attorney, Agent, or Firm* — Hogan Lovells US LLP

(57) ABSTRACT

Deselect times can be specified for transactions that are to utilize a communication bus shared by multiple devices. A host can communicate with a multiplexer to select a channel for communication on that bus. If this host communicates with the multiplexer over the bus as well, the host can be prevented from instructing the multiplexer to deselect a channel if the bus is hung. To provide for recovery in such situations, one or more deselect times can be specified for one or more channels of a bus. If a transaction for a device on one of these channels is ongoing when the deselect time is reached, the multiplexer can automatically deselect that channel in order to enable other devices to communicate over other channels on that bus. In some embodiments, a riskiness of a transaction or device can be determined for purposes of applying or determining a relevant deselect time.

21 Claims, 6 Drawing Sheets

(56) References Cited

U.S. PATENT DOCUMENTS

| | | | |
|---|---|---|---|
| 2012/0120966 A1* | 5/2012 | Balasubramanian | ......................... H04L 12/4015 370/412 |
| 2013/0041613 A1* | 2/2013 | Bhide | ................... G06F 11/263 702/123 |
| 2016/0014035 A1* | 1/2016 | Ram | ................... H04L 41/5087 370/235 |
| 2017/0277644 A1* | 9/2017 | Baba | ................... G06F 13/4022 |

* cited by examiner

COMMUNICATION BUS RECOVERY BASED ON MAXIMUM ALLOWABLE TRANSACTION DURATION

BACKGROUND

Various computing devices utilize communication buses to transfer data between components. There may be multiple devices that can communicate over such a bus, but these devices may only be able to communicate over that bus one at a time. In the event that one of these devices gets hung or is otherwise continually communicating over this bus, the other devices may be unable to communicate. For implementations where all communications to a multiplexer or other channel selection device also occur over this bus, there may be no way to recover without manual intervention that may result in undesirable downtime for all those devices.

BRIEF DESCRIPTION OF THE DRAWINGS

Various embodiments in accordance with the present disclosure will be described with reference to the drawings, in which.

DETAILED DESCRIPTION

Approaches in accordance with various embodiments provide for recovery from communication bus issues, such as where a device is causing that bus to be hung or otherwise unavailable for other communications. A communication bus, such as an inter-integrated circuit ($I^2C$) bus, may connect multiple devices that can all communicate using that bus, but where that bus only allows communication for one device, over one channel, at a time. A host, such as a central processing unit (CPU) or other $I^2C$ master, can communicate with a multiplexer, or mux, to select a channel for communication and the respective device can then communicate over that channel. In designs where this host also communicates with the mux over the $I^2C$ bus, the host can be prevented from instructing the mux to deselect a channel if that channel is causing the bus to be hung, or is otherwise preventing other communications on that bus. Approaches in accordance with various embodiments enable a host to specify one or more deselect times, or "select" or maximum times, to be used for one or more channels to communicate on a bus. If a transaction for a device on one of these channels lasts for the specified deselect time, the mux can automatically deselect that channel in order to enable other devices to communicate over other channels. In some embodiments, a riskiness of a transaction or device can be determined for purposes of applying or determining a relevant deselect time for a transaction. If a channel is deselected, an appropriate remedial action may be taken, at least after a number or frequency of deselects in some embodiments, such as to repair or remove the device.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Various other functions can be implemented within the various embodiments as well as discussed and suggested elsewhere herein.

Figure 1A:
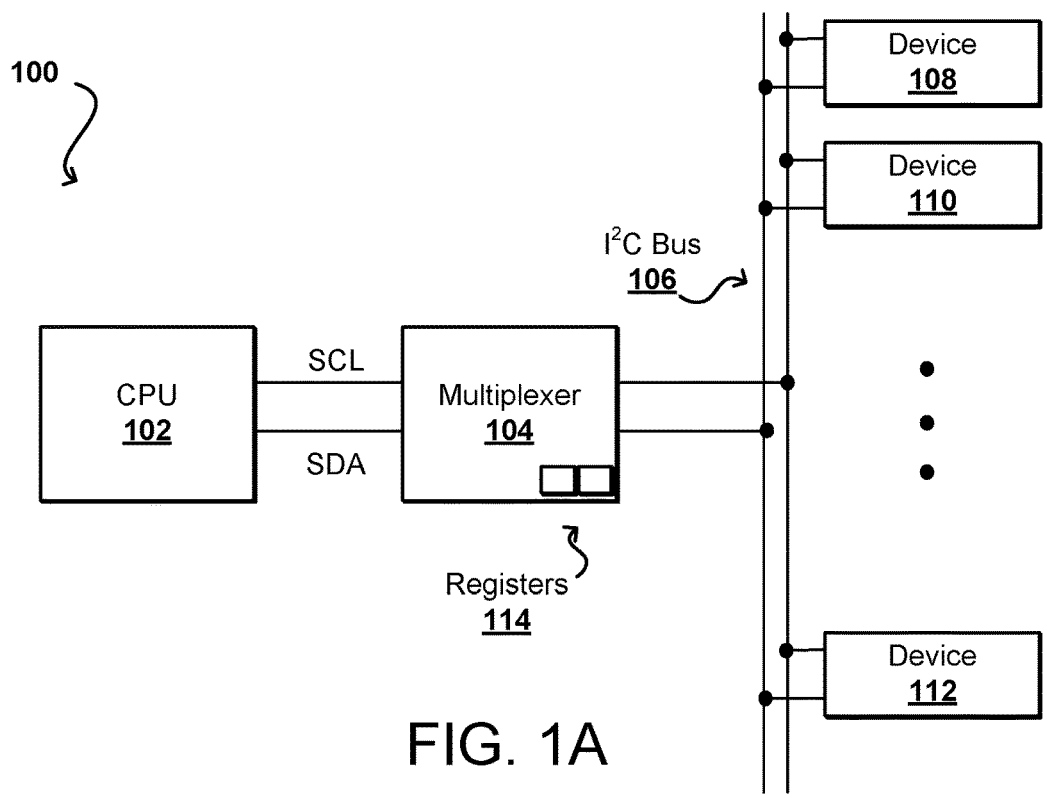
FIGS. 1A and 1B illustrate an architecture that provides for bus management in accordance with various embodiments.
Figure 1B:
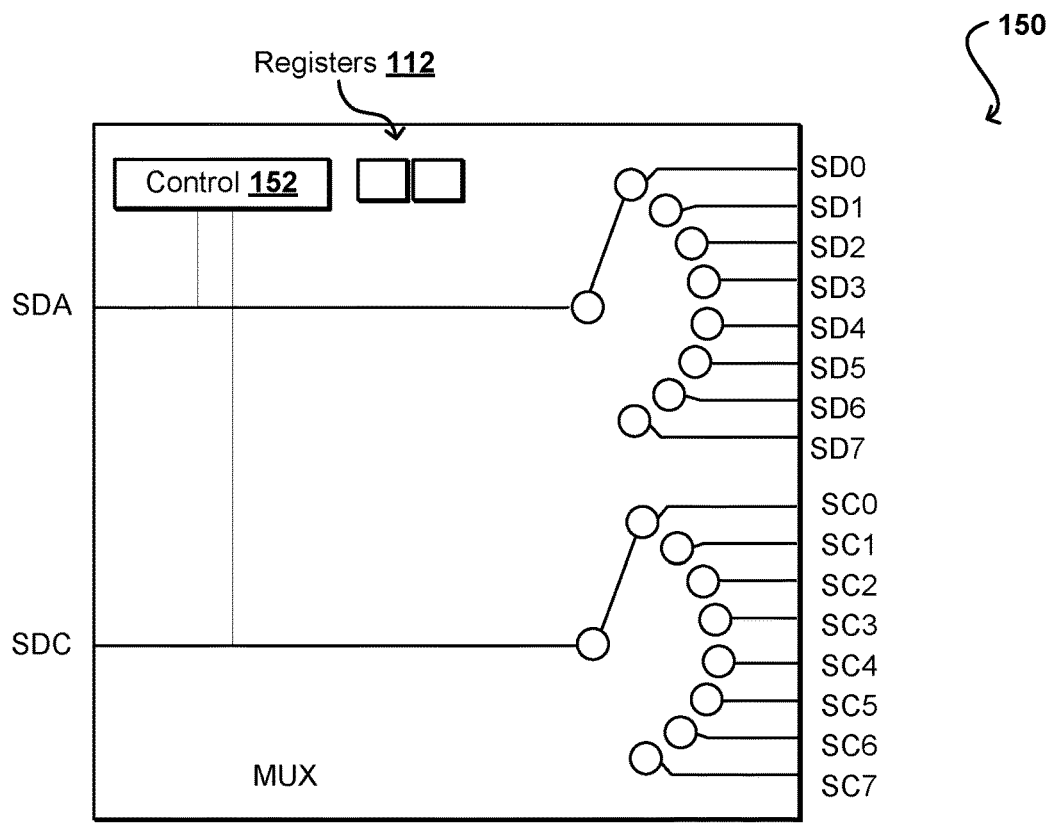

FIG. 1A illustrates an example architecture 100 that can be used to implement aspects of various embodiments. In this example, a device such as a central processing unit (CPU) 102 can communicate with various devices 108, 110, 112, over a communication bus 106. In at least one embodiment, this bus can be an inter-integrated circuit ($I^2C$) bus that can enable an $I^2C$ master, here CPU 102, to communicate with a number (e.g., up to 8) of $I^2C$ slaves, here computing or other electronic devices, over the $I^2C$ bus. A multiplexer 104, or mux, can be used to select devices to communicate with the CPU 104 over this bus 106. An $I^2C$ bus typically has two wires, including a data line and a clock line. There may be eight different devices all connected to these same two wires which can take turns communicating over this bus 106. Unfortunately, if any of those devices are communicating over that bus and get hung or stuck, then the bus 106 will remain dedicated to that hung device and none of the other devices will be able to communicate over that bus 106 until an appropriate remedial action is taken. In another example, a device that continues to communicate can pull the bus indefinitely, preventing the bus from being used for communication for another device. An advantage of using a multiplexer 104 to select between channels for these devices is that the bus is only at risk of getting hung by one device at a time. FIG. 1B illustrates an example multiplexer 150 wherein a control mechanism 152 is able to select and deselect various channels for bus communication. Unfortunately, for at least some designs the multiplexer 104 can only communicate over the $I^2C$ bus 106, such that if the bus is hung then the host, or CPU 102 in this example, cannot communicate with the multiplexer 104 for purposes of deselection or switching. In at least some conventional designs, then, there is no mechanism for deselecting a currently selected channel without manual intervention and downtime. Even in designs with a "reset" option available to the mux, such communication is prevented as it also requires communication over the currently hung $I^2C$ bus.

Accordingly, approaches in accordance with various embodiments can utilize configurable select times, or deselect times, within a switching component such as an $I^2C$ multiplexer, causing the multiplexer to deselect a current channel for a respective device after a specified period of time. In at least some embodiments, this can be performed in hardware, or a combination of hardware and software. The time period can be configurable, and can be applied per channel, per transaction, or at any other appropriate time. Such a mechanism enables the mux to self-recover the $I^2C$ bus by deselecting the currently-selected channel after a certain period of time, as may be configured by the user and specified prior to the $I^2C$ bus being hung or otherwise monopolized by a given transaction or device.

In at least one embodiment, an I²C mux 104 can be initialized with a select time (or "deselect" time, etc.), such as 10 seconds. This may be for all channels or a specific channel in various embodiments. A host, such as CPU 102, can communicate with the mux 104 to select a specific I²C channel, such as channel 1. The I²C device corresponding to channel 1 can then begin communicating on the I²C bus. If I²C channel 1 contains a broken module or hung device, for example, the entire I²C bus can be hung. In this case, the host CPU 102 can no longer send any I²C communication on that bus while the bus is hung, or otherwise unavailable, such that resetting or requesting the mux 104 to deselect channel 1 is prevented. Some implementations may utilize side channels or other mechanisms for enabling a host to communicate with a mux, but for implementations without such a mechanism where communications are available only over this bus, the mux will be unable to receive communications from the host while the bus is hung or otherwise in a state where such communications are unavailable. When a bus such as an I²C is hung, since it is only a limited (e.g., two) wire bus and both those wires are used for communication, if any of those wires is pulled high or pulled low, or otherwise being driven in a strange way by a currently selected device, this "hung" state will remove an ability for other devices, including a host, to communicate over this bus. After the select time of 10 s has passed, however, the hardware in the I²C mux itself can deselect the channel. After such deselection, the I²C bus is recovered, and host CPU 102 can again send I²C communications and select other channels. Such an approach enables the I²C multiplexer itself to deselect a channel, without any outside stimulus from the host that is unable, at that time, to provide commands over the otherwise hung I²C bus.

In at least one embodiment, instead of a time-based deselect such a process could utilize a 'stuck detection' model-based approach. In such an embodiment, the SDA/SCL lines can be monitored, and if any are held in any single state for longer than a determined number of seconds then the current channel can be deselected. For such an approach, the number of seconds can be much less than the 10 second deselect time mentioned above, such as may be on the order of 1 s or 500 ms, allowing for faster and more purposeful recovery in at least some situations. In at least one embodiment an additional register could be added to an I²C mux that that tracks "bad channels." In such an approach, if a channel was selected and one of these deselection criteria is satisfied, then the I²C mux can remember that the last time this channel was selected the selection timed out. This information could be provided to the host or could be used, for example, to completely block selections of this channel to improve bus performance until some clearing action is performed for that bad channel.

In at least some embodiments, a host or other component may determine a riskiness of a channel selection. This may include, for example, determining whether a device for a channel has had a successful, or unsuccessful, selection previously, or has otherwise communicated over the I²C bus. A risk determination may also be made using factors such as a type of transaction or communication, typical load on a bus, typical frequency of selection, or other such factors. For example, a risk determination function might include weightings for two or more risk factors. Such a function might have a high weight value for a new device, and might have a lower value for a bus load factor, wherein more risk may be acceptable if there is a low bus load. If a device is selected frequently without issue, that might also be factored in relatively highly, while a device that is selected relatively infrequently may have a relatively high risk. If a determination is made that a transaction or device is not risky, then no deselect time may be provided, or a relatively long deselect time may be provided. If a determination is made that a transaction or device is risky, then a deselect time can be provided, where the length of time may be correlated to the amount of risk. If a risk level is higher than an allowable threshold, then the device or channel may be prevented from being selected for at least a current time, or can be blacklisted in some situations.

Figure 2:
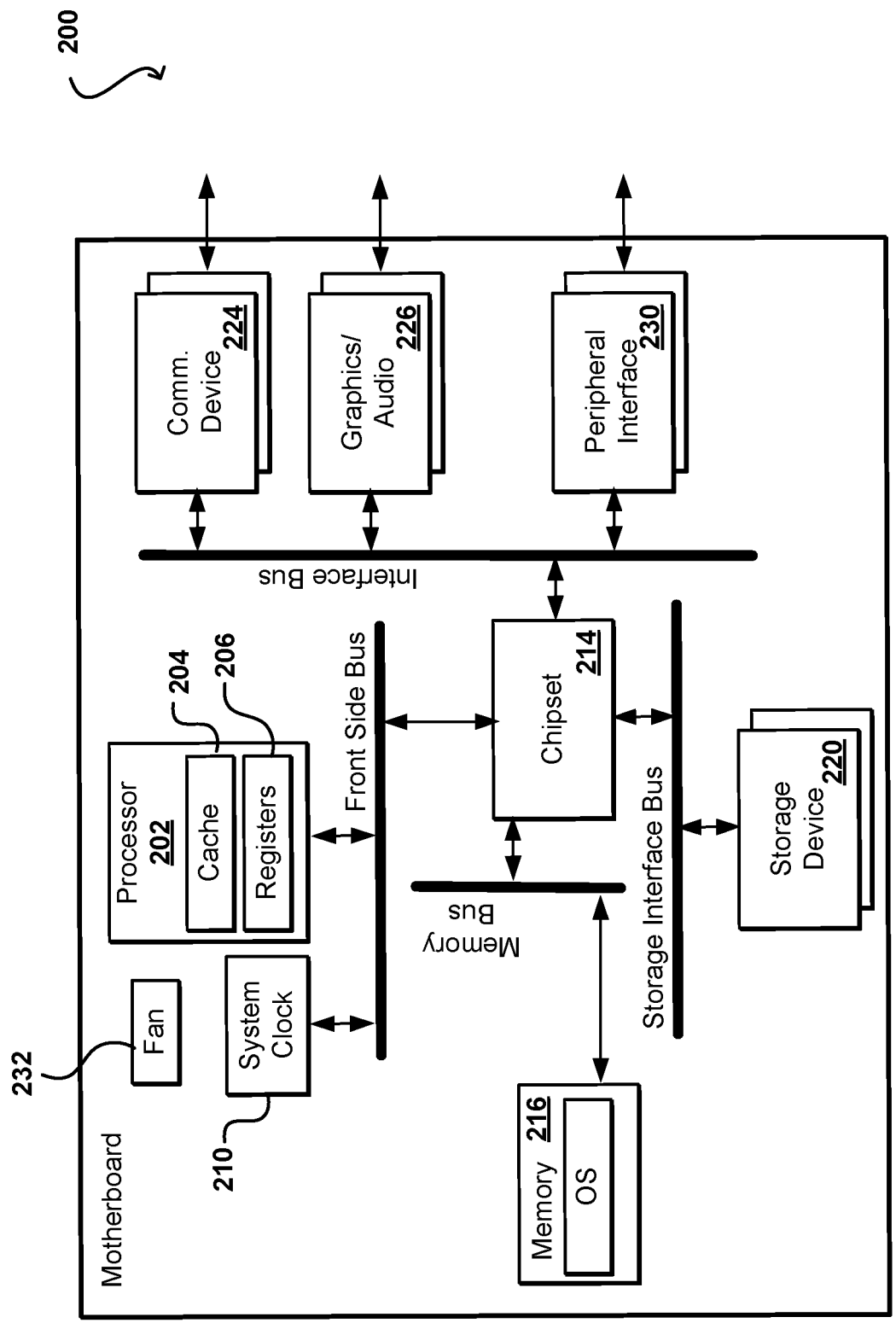
FIG. 2 illustrates components of an example computing device in which aspects of various embodiments can be implemented.

Computing resources, such as servers, may include at least a set of standard components configured for general purpose operation, although various proprietary components and configurations can be used as well within the scope of the various embodiments. FIG. 2 illustrates components of an example computing device 200 that can be utilized in accordance with various embodiments. As known for computing devices, the computer will have one or more processors 202, such as central processing units (CPUs), graphics processing units (GPUs), and the like, that are electronically and/or communicatively coupled with various components using various buses, traces, and other such mechanisms. A processor 202 can include memory registers 206 and cache memory 204 for holding instructions, data, and the like. In this example, a chipset 214, which can include a northbridge and southbridge in some embodiments, can work with the various system buses to connect the processor 202 to components such as system memory 216, in the form or physical RAM or ROM, which can include the code for the operating system as well as various other instructions and data utilized for operation of the computing device. The computing device can also contain, or communicate with, one or more storage devices 220, such as hard drives, flash drives, optical storage, and the like, for persisting data and instructions similar, or in addition to, those stored in the processor and memory. The processor 202 can also communicate with various other components via the chipset 214 and an interface bus (or graphics bus, etc.), where those components can include communications devices 224 such as cellular modems or network cards, media components 226, such as graphics cards and audio components, and peripheral interfaces 230 for connecting peripheral devices, such as printers, keyboards, and the like. At least one cooling fan 232 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 202 can obtain data from physical memory 216, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 204 in at least some embodiments. The computing device 200 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 230, a communication device 224, a graphics or audio card 226, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 202 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

As mentioned, various implementations of such computing devices that utilize a communication bus, such as an I²C bus, will have a single communication master, such as an I²C master, that will manage communications over that bus. The I²C master, such as a host or CPU, can communicate with a multiplexer over an I²C bus to manage the selection and deselection of channels for various connected devices to communicate over the bus. In at least some embodiments, an I²C host will provide instructions to select a specific channel by initiating and I²C transaction through the multiplexer, or mux. As mentioned, however, if one of those devices with an actively selected channel gets hung or continuously communicates over that bus the I²C master will not be able to perform a transaction over that bus to deselect the current channel, so there can be no communication over other channels of that bus.

Various embodiments can then utilize I²C transactions to specify select, or deselect, times for an I²C bus. These deselect times can be sent via transactions with the respective mux, and will generally be sent in advance of an actual selection transaction, although the deselect time may be sent with the selection transaction in some embodiments. In various embodiments, the deselect times can be sent per channel, such that any subsequent transactions on that channel will have that deselect time applied. In at least some embodiments, these deselect times can be stored to one or more registers 114 in a mux, where some or all channels may have such values stored. In some embodiments a deselect time may apply to all channels for a respective I²C bus. In some embodiments a deselect time can be sent for each transaction, providing more granular control. In such embodiments, a separate transaction can be sent ahead of each channel select transaction to indicate the deselect time to be used for that transaction. Once the appropriate deselect time is stored in such a register of the mux, the actual deselection action can be performed in hardware if the deselect time for that channel is reached.

As mentioned, in at least some embodiments the application or duration of such a select time may be based, at least in part, upon one or more risk criteria. For example, if a new device is connected to the bus with no communication history then this device, or transactions for this device, can be considered risky. If a device or channel has a history of getting hung or otherwise needing to be deselecting for hanging the bus then that device can be considered risky. Further, certain types of transactions or devices may be considered more or less risky as well, which can impact the selection and application of a deselect time. Similarly, there may be devices or transactions which should not be considered risky and should not have deselect values applied. These can include, for example, long-running transactions such as firmware updates. Because these transactions may run for an extended period of time and it can be undesirable to interrupt the transaction, a host or relevant software may decide not to implement a deselect time for that transaction, even if a deselect time is set by default for all transaction. In some instances these transactions may simply have longer deselect times specified, as discussed in more detail elsewhere herein. By enabling configurable deselect times, as well as an ability to specify not to deselect a specific transaction, such an approach does not have to rely on stuck detection of a hung bus, for example, which may impose limits on a time, length, or type of transactions that can be performed. Further, this allows for dynamic configuration of appropriate deselect times for untrusted, risky, or pluggable/unpluggable channels, as well as being able to determine to not apply a deselect time to channels that are trusted or are associated with unique transactions that might otherwise be disturbed by other models. Having a single channel selected for a longer period of time, while not done often, can allow for overall transfer speed to be increased, without having to deselect and reselect every time. Enabling deselect times per channel can also remove any need for software to make a selection for each transaction or channel selection.

In at least one embodiment, a host can send a whitelist or other such value to the mux to cause the mux to not apply any deselect value. Some embodiments may also utilize a blacklist, wherein transactions for various devices are either always denied or always have a very strict deselect time applied. In some embodiments, historical information may be utilized such that an initial deselect time for a device might be at a longer time value, such as ten seconds, wherein subsequent values may decrease if deselect actions occur, such that a deselect value might drop to one second or less after multiple deselect actions. In at least some embodiments, however, deselect times should be sufficiently long as to allow valid transactions on the bus to complete before those deselect times are reached and the transactions are interrupted. I²C transactions in at least one embodiment occur at around 100-400 kHz. In some embodiments the deselect action can be caused to be triggered when the deselect time is reached regardless of an ability to communicate, while in other embodiments the action is only taken if the mux has not received any communications from the I²C host.

In many instances, I²C devices will be hardwired into a system or computing device, such that the device communicating over a given channel of an I²C bus will not change. It may be the case, however, that one or more pluggable (and unpluggable) I²C devices are utilized. In such an implementation, I²C devices may be swapped over time, such that an I²C master may not be able to know, in advance, which device is currently plugged into the system and associated with an upcoming transaction. In at least some embodiments, each transaction associated with a pluggable device channel can have at least a minimum level of risk associated, as it may be impossible, or at least difficult, to determine in advance whether the transaction is associated with a new or previously problematic device, as the device may have been swapped out since a last transaction on that channel. In some embodiments, a deselect time may be applied automatically to any channel associated with a pluggable I²C device.

Embodiments can include a non-programmable implementation in an integrated circuit (IC) or a programmable implementation in a field-programmable gate array (FPGA). For an FPGA, deselect time management can be implemented in FPGA logic. For an IC-based implementation, however, many I²C do not have concept of time, such that an oscillator or external clock source may need to be utilized.

Figure 3:
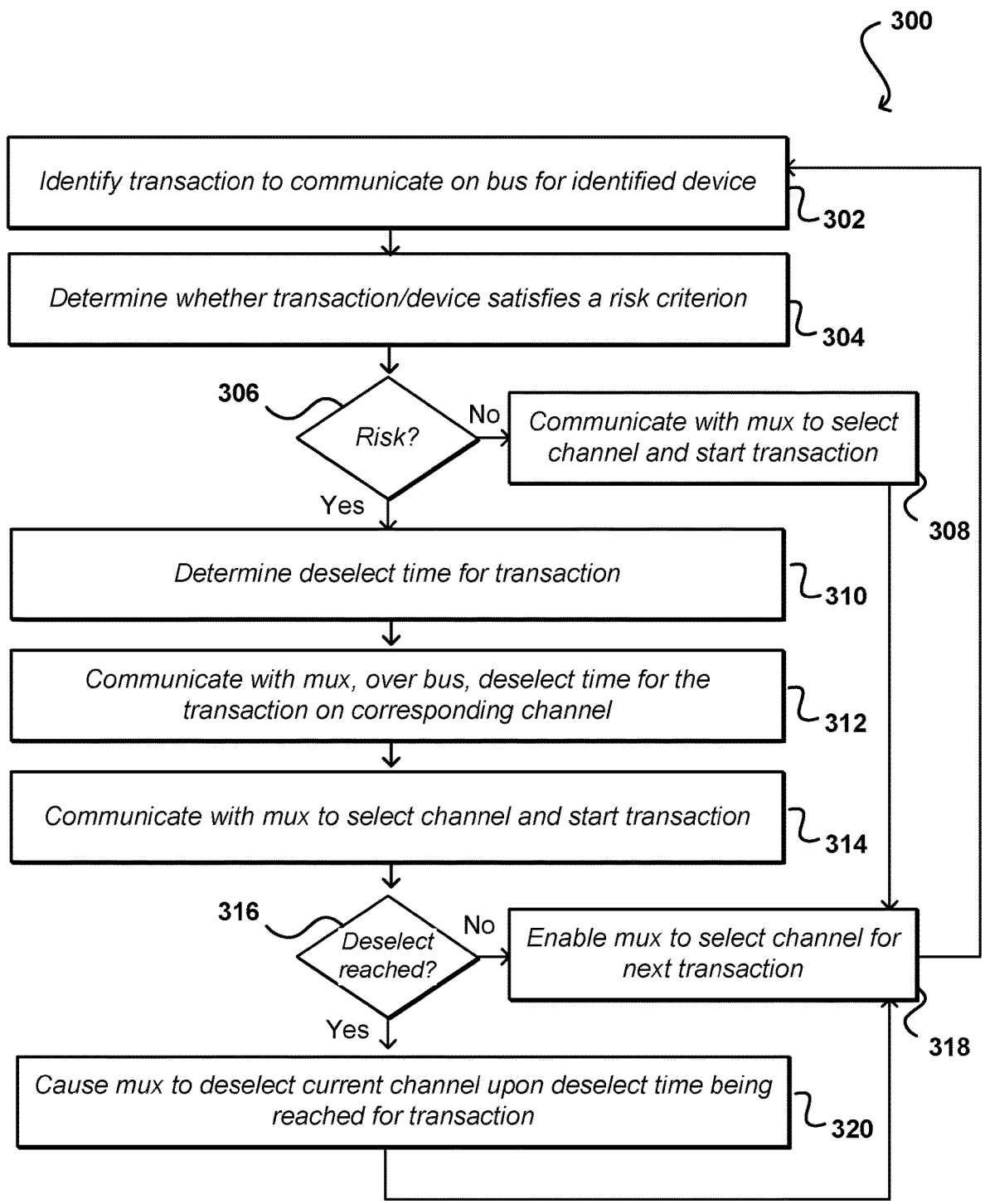
FIG. 3 illustrates an example process for specifying deselect times for transactions that can be utilized in accordance with various embodiments.

FIG. 3 illustrates an example process 300 for communication bus recovery that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, a transaction to communicate on a communication bus, such as an I²C bus, can be identified 302 that relates to a specific device. An I²C host, such as a CPU running a Linux kernel, can analyze information for this transaction to determine 304 whether the host, channel, or transaction satisfies a risk criterion, or meets a risk threshold, etc. If it is determined 306 that the transaction does not satisfy such a risk criterion then the I²C can communicate 308 with the mux to select the appropriate channel and initiate the transaction.

If, however, it is determined that at least one risk criterion is satisfied then the I²C host, or relevant software in communication with that host, can determine 310 a deselect time to be applied for that transaction. As presented, the deselect time may be determined based upon various factors in various embodiments, as may include a communication history, type of device, or type of transaction, among other such factors. In at least one embodiment, a deselect function might be used that is similar to a risk function discussed previously, which is a weighted combination of two or more terms. For example, a type of device or transaction may be relatively safe, such that a longer deselect time might be applied for an infrequent request than for a type or transaction that is unknown or determined to be risky. Similarly, a known device with a history of high risk might have a shorter deselect time applied than an unknown device. Once determined, the I²C host can initialize the mux by communicating 312 with the mux, over the I²C bus, the deselect time for the transaction on the corresponding channel. In this example, deselect times can be specified for individual transactions, where otherwise no deselect time or a default deselect time may be applied. After the deselect time is communicated to the mux in this example, the I²C host can communicate 314 with the mux to select the appropriate channel and start the transaction. The transaction can be monitored to determine 316 whether the maximum or deselect time has been reached, at least without the channel being deselected or communication from the I²C host being received. If the deselect time is not reached then the system can operate under expected operating conditions and the mux can be enabled 318 to select a new channel at the appropriate time for a new transaction. If, however, the deselect time is reached then the mux can be caused 320 to deselect the current channel such that another channel can be selected for communication over the I²C bus. The process can then continue with another channel being selected, unless another error occurs. In at least some embodiments, a device having to be selected more than a maximum number of times, or with more than an allowable frequency, can be flagged for removal or repair, or another such remedial action.

Figure 4:
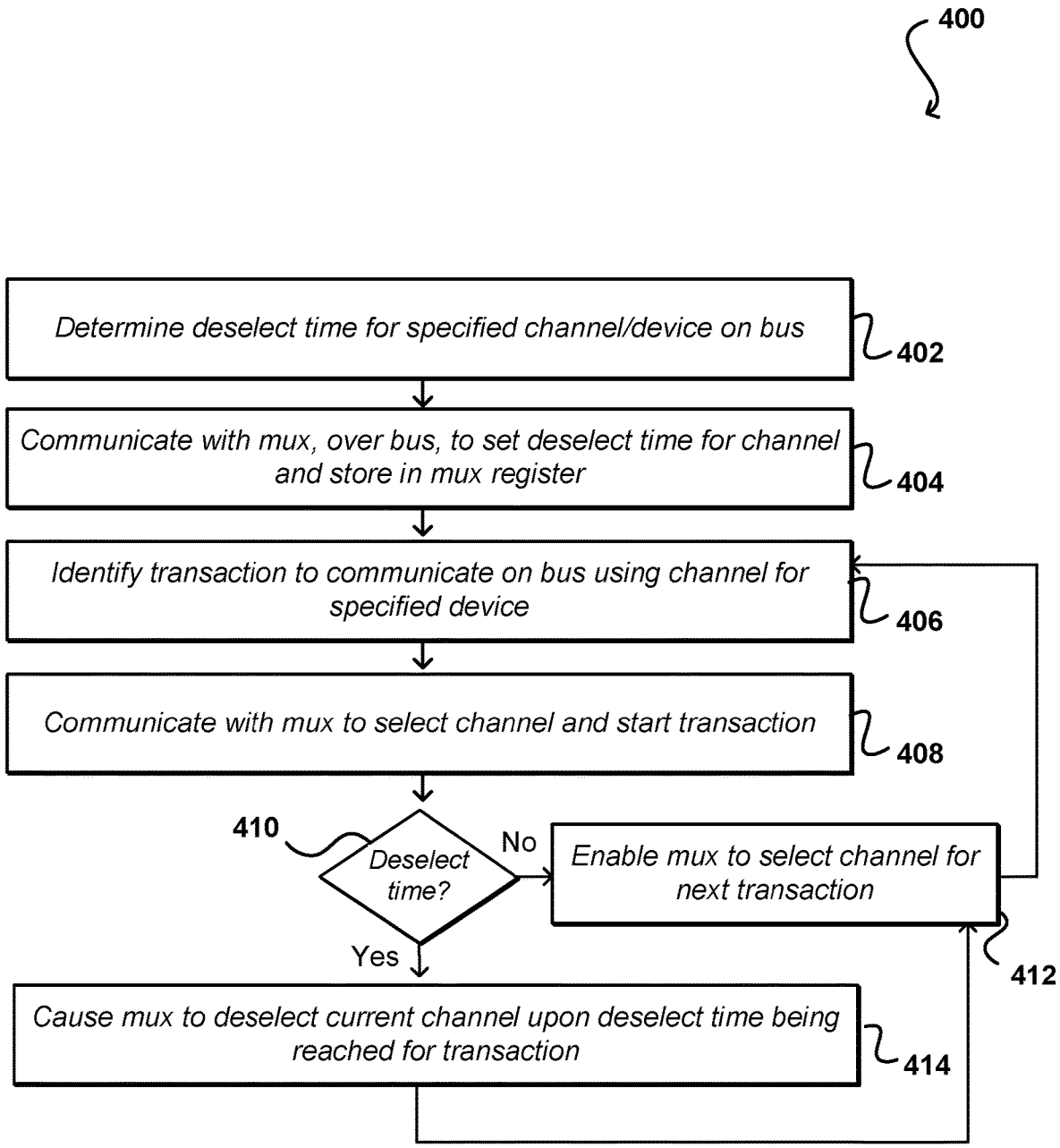
FIG. 4 illustrates an example process for specifying deselect times for a communication channel that can be utilized in accordance with various embodiments.

FIG. 4 illustrates another example process 400 for communication bus recovery that can be utilized in accordance with various embodiments. In this example, deselect times can be provided per channel instead of per transaction. An I²C host, such as a CPU running a Linux kernel, can analyze information for a channel or device to communicate on an I²C bus to determine 402 a deselect time, or timeout value, to be applied for transactions on that channel with a respective I²C device. As with other embodiments, the deselect time may be determined based upon various factors in various embodiments. Once determined, the I²C host can communicate 404 with the mux, over the I²C bus, the set timeout value or deselect time for the transaction on the corresponding channel to be stored in a mux register or other such location. After the deselect time is communicated to the mux in this example, the I²C host can identify 406 a transaction to communicate on the I²C using the channel for a specified I²C device. The I²C host can communicate 408 with the mux to select the appropriate channel and start the transaction. The transaction can be monitored to determine 410 whether the maximum, timeout, or deselect time has been reached, at least without the channel being deselected or communication from the I²C host being received. If the deselect time is not reached then the system can operate under expected operating conditions and the mux can be enabled 412 to select a new channel at the appropriate time for a new transaction. If, however, the deselect time is reached then the mux can be caused 414 to deselect the current channel such that another channel can be selected for communication over the I²C bus. The process can then continue with another channel being selected, unless another error occurs. In at least some embodiments, a device having to be selected more than a maximum number of times, or with more than an allowable frequency, can be flagged for removal or repair, or another such remedial action. In some embodiments, a deselected channel cannot be selected again until an indication is received that the channel or device has been investigated and determined to have a low enough risk to again be selected for communication. In some embodiments, a full reset may be performed instead of a channel deselect action. Such approaches can be used with other bus technologies as well, such as SMBUS or PMBUS.

Figure 5:
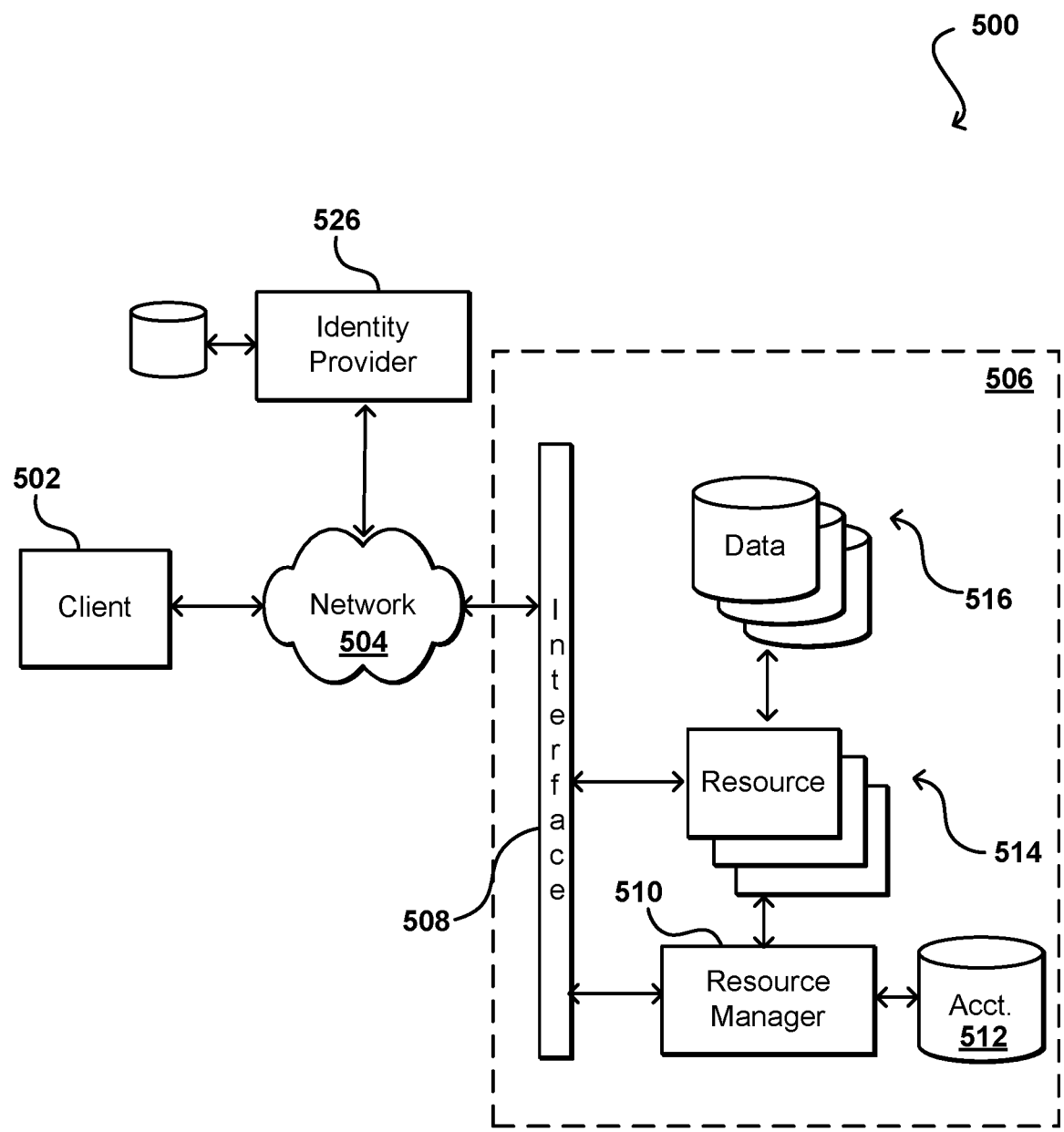
FIG. 5 illustrates components of an example computing environment in which aspects of various embodiments can be implemented.

FIG. 5 illustrates an example system 500 that can enable a user to obtain access to resources provided as part of a resource provider environment 506. These resources can include physical and virtual resources that may be located at one or more locations controlled by the provider or a third party, or may be located on a location controlled by the user, or an entity with which the user is associated. In this example, a user can utilize a client device 502 to access resources of the resource provider environment 506 over one or more networks. The client device 502 can include any appropriate electronic device operable to send and receive requests, messages, or other such information over an appropriate network and convey information back to a user of the device. Examples of such client devices include personal computers, tablet computers, smart phones, notebook computers, and the like. The network(s) 504 can include any appropriate network, including an intranet, the Internet, a cellular network, a local area network (LAN), or any other such network or combination, and communication over the network can be enabled via wired and/or wireless connections. The resource provider environment 506 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

The resource provider environment 506 may be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

In various embodiments, the resource provider environment 506 may include various types of electronic resources that can be utilized by multiple users for a variety of different purposes. In at least some embodiments, all or a portion of a given resource or set of resources might be allocated to a particular user or allocated for a particular task, for at least a determined period of time. This can include, for example, enabling a customer to launch one or more instance of one or more types of these resources. In at least one embodiment, a resource instance can include storage volumes, compute instances, and network interfaces, among other such options. This can include, for example, enabling a customer to launch one or more instance of one or more types of these resources. In at least one embodiment, a resource instance can include storage volumes, compute instances, and network interfaces, among other such options. The sharing of these multi-tenant resources from a provider environment is often referred to as resource sharing, Web services, or "cloud computing," among other such terms and depending upon the specific environment and/or implementation. In this example the provider environment includes a plurality of electronic resources 514 of one or more types. These types can include, for example, application servers operable to process instructions provided by a user or database servers operable to process data stored in one or more data stores in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 514 can submit a request that is received to an interface layer 508 of the provider environment 506. The interface layer can include application programming interfaces (APIs) or other exposed interfaces enabling a user to submit requests to the provider environment. The interface layer 508 in this example can also include other components as well, such as at least one Web server, routing components, load balancers, and the like. When a request to provision a resource is received to the interface layer 508, information for the request can be directed to a resource manager 510 or other such system, service, or component configured to manage user accounts and information, resource provisioning and usage, and other such aspects. A resource manager 510 receiving the request can perform tasks such as to authenticate an identity of the user submitting the request, as well as to determine whether that user has an existing account with the resource provider, where the account data may be stored in at least one data store 512 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider 518, a key management service, a corporate entity, a certificate authority, an identify broker, and the like. In some embodiments, a user can provide information useful in obtaining the credentials, such as user identity, account information, password, user-specific cryptographic key, customer number, and the like. The identity provider can provide the credentials to the resource provider environment 506 and/or to the client device 502, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 502 to communicate with an allocated resource without having to communicate with the resource manager 510, at least until such time as a relevant aspect of the user account changes, the user is no longer granted access to the resource, or another such aspect changes.

The resource manager 510 (or another such system or service) in this example can also function as a virtual layer of hardware and software components that handles control functions in addition to management actions, as may include provisioning, scaling, replication, etc. The resource manager 510 can utilize dedicated APIs in the interface layer 508, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 808 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service.

Figure 6:
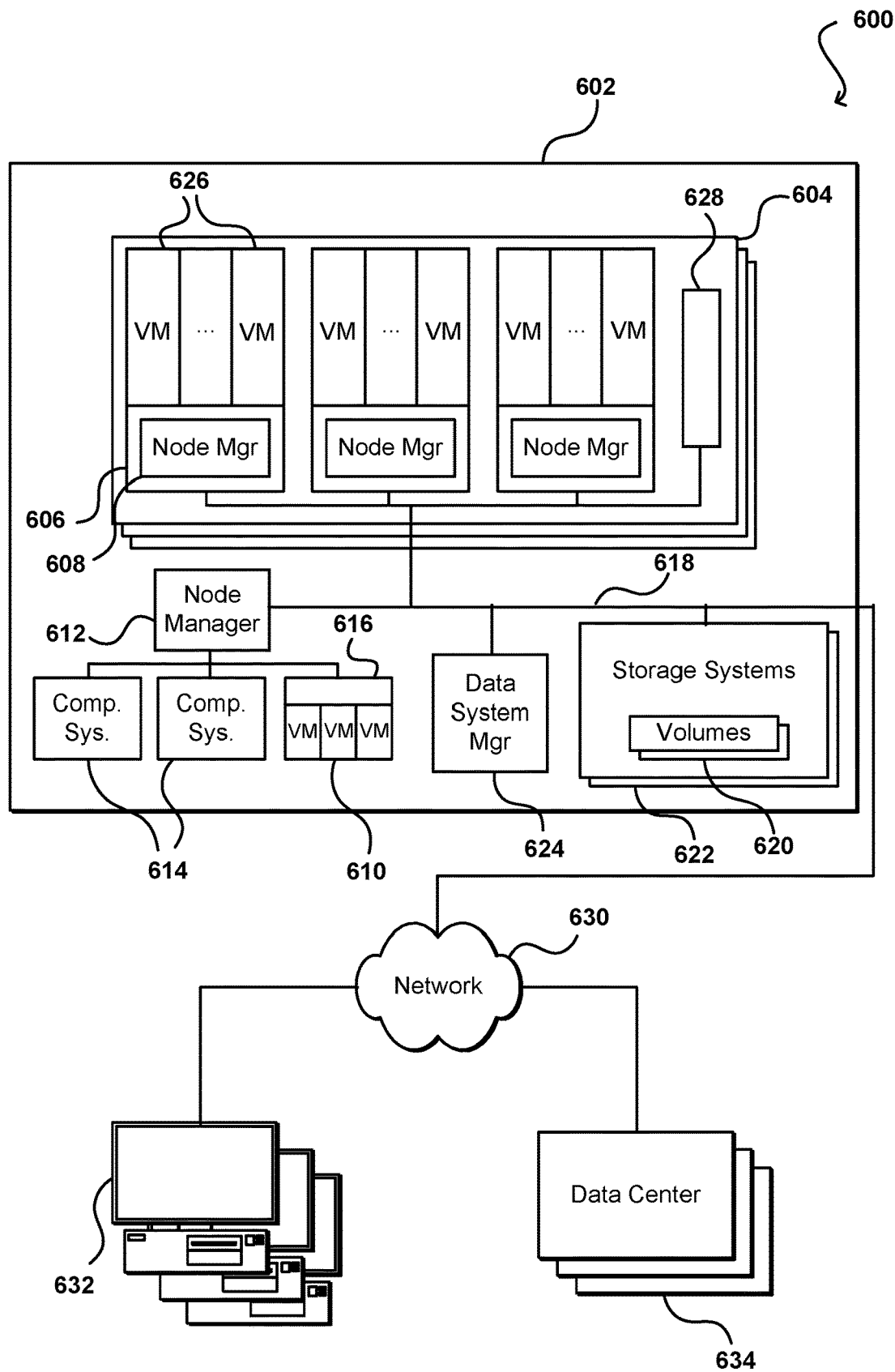
FIG. 6 illustrates components of another example environment in which aspects of the various embodiments can be implemented.

FIG. 6 illustrates an example network configuration 600 in which such provisioning can be implemented in accordance with various embodiments. In this example configuration, multiple computing systems are operable to execute various programs, applications, and/or services, and further operable to access reliable block-based data storage, such as under the control of a block-based data storage service. In particular, in this example a block-based data storage service uses multiple block-based data storage systems in a data center to provide reliable, non-local, block-based data storage to executing programs or various other components, systems, or services. Multiple remote archival storage systems external to the data center may also be used to store additional copies of at least some portions of at least some block-based data storage volumes.

In this example, a data center 602 includes a number of racks 604, each rack including a number of host computing devices 606, as well as an optional rack support computing system 628 in this example embodiment. The host computing systems 606 on the illustrated rack 604 each host one or more virtual machines 626 in this example, as well as a distinct node manager module 612 associated with the virtual machines on that host computing system to manage those virtual machines. One or more other host computing systems 616 may also each host one or more virtual machines 610 in this example. Each virtual machine 610 may act as an independent resource node for executing one or more program copies or performing another such action or process for user data requests, I/O operations, etc. In addition, this example data center 602 further includes additional host computing systems 614 that do not include distinct virtual machines, but may nonetheless each act as a resource node for one or more tasks being executed for a user. In this example, a node manager module 612 executing on a computing system (not shown) distinct from the host computing systems 614 and 616 is associated with those host computing systems to manage the resource nodes provided by those host computing systems, such as in a manner similar to the node manager modules 608 for the host computing systems 606. The rack support computing system 628 may provide various utility services for other computing systems local to its rack 604 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example the data center 602 also includes a computing system 624 that executes a data storage system manager module for the block-based data storage service to assist in managing the availability of non-local block-based data storage to programs executing on resource nodes provided by the host computing systems located within the data center (or optionally on computing systems located in one or more other data centers 634, or other remote computing systems 632 external to the data center). In particular, in this example the data center 602 includes a pool of multiple block-based data storage systems 622, which each have local block-based storage for use in storing one or more volume copies 620. Access to the volume copies 620 is provided over the internal network(s) 618 to programs executing on various resource nodes 610 and 614. As discussed in greater detail elsewhere, a block-based data storage system manager module 624 may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the system manager module 622 may coordinate with the node manager modules 612, 608 to manage use of volumes by programs executing on associated resource nodes, while in other embodiments the node manager modules may not be used to manage such volume use. In addition, in other embodiments, one or more system manager modules 624 may be structured in other manners, such as to have multiple instances of the system manager executing in a single data center (e.g., to share the management of non-local block data storage by programs executing on the resource nodes provided by the host computing systems located within the data center), and/or such as to have at least some of the functionality of a system manager module being provided in a distributed manner by software executing on some or all of the server block data storage systems 622 (e.g., in a peer-to-peer manner, without any separate centralized system manager module on a computing system 624).

In this example, the various host computing systems, server block data storage systems, and computing systems are interconnected via one or more internal networks 618 of the data center, which may include various networking devices (e.g., routers, switches, gateways, etc.) that are not shown. In addition, the internal networks 618 are connected to an external network 630 (e.g., the Internet or another public data network) in this example, and the data center 602 may further include one or more optional devices (not shown) at the interconnect between the data center and an external network (e.g., network proxies, load balancers, network address translation devices, etc.). In this example, the data center 602 is connected via the external network 630 to one or more other data centers 634 that each may include some or all of the computing systems and storage systems illustrated with respect to data center 602, as well as other remote computing systems 632 external to the data center. The other computing systems 632 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server data storage systems may further be interconnected with one or more other networks or other connection mediums, such as a high-bandwidth connection over which the storage systems may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 6 has been simplified for the purposes of explanation, and that the number and organization of host computing systems, server block data storage systems and other devices may be much larger than what is depicted in FIG. 6. For example, as one illustrative embodiment, there may be thousands of computing systems per data center, with at least some of those computing systems being host computing systems that may each host fifteen virtual machines or more, and/or with some of those computing systems being block-based data storage systems that may each store several volume copies. If each hosted virtual machine executes one program, a data center may execute tens of thousands of program copies at one time. Furthermore, hundreds or thousands (or more) of volumes may be stored on the server block data storage systems, depending on the number of server storage systems, size of the volumes, and number of mirror copies per volume. It will be appreciated that in other embodiments, other numbers of computing systems, programs and volumes may be used.

Example environments discussed herein for implementing aspects in accordance with various embodiments are primarily Web-based, as relate to Web services and cloud computing environments, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    determining a first transaction, for a first device, to be communicated over a first channel of a communication bus;
    determining a deselect time for the first transaction based on a level of risk for at least one of the first transaction or the first device, the deselect time determined for the level of risk and specifying a maximum allowable duration for the first transaction on the communication bus, the level of risk based on two or more risk factors;
    sending the deselect time for the first channel to a multiplexer for the communication bus;
    instructing the multiplexer to select the first channel and initiate the first transaction;
    determining, by the multiplexer, that the deselect time for the first transaction has been reached;
    causing the multiplexer to automatically deselect the first channel; and
    enabling the multiplexer to select a second channel for a second transaction, associated with a second computing device, to be communicated over the communication bus.

2. The computer-implemented method of claim 1, wherein the communication bus is an inter-integrated circuit (I2C) bus.

3. The computer-implemented method of claim 1, wherein the two or more risk factors include transaction type of the first transaction and frequency of selection of the first device.

4. The computer-implemented method of claim 1, further comprising:
    causing the deselect value to be stored to a register in the multiplexer, wherein the multiplexer is enabled to deselect the first channel without being able to receive external instructions from a communication host.

5. The computer-implemented method of claim 1, wherein a plurality of deselect times are enabled to be specified per transaction or per channel for the communication bus.

6. A computer-implemented method, comprising:
    providing, to a multiplexer for a communication bus, a deselect time for a channel corresponding to a device, the deselect time based on a level of risk for at least one of the device or a transaction associated with the device, the deselect time specifying a maximum allowable duration determined for the level of risk, the level of risk based on two or more risk factors;

causing the multiplexer to select the channel to enable communications for the transaction; and causing the multiplexer to deselect the channel at the deselect time, wherein other devices are enabled to communicate over the communication bus using other channels as selected by the multiplexer.

7. The computer-implemented method of claim 6, wherein the communication bus is an inter-integrated circuit (I2C) bus, and wherein a host providing the deselect time communicates with the multiplexer over the I2C bus.

8. The computer-implemented method of claim 6, wherein the two or more risk factors include transaction type of the transaction and frequency of selection of the device.

9. The computer-implemented method of claim 6, wherein the risk factors include at least one of a communication history for the channel, a communication history for the device, a type of the transaction, or whether the device is unpluggable from the communication bus.

10. The computer-implemented method of claim 6, wherein different deselect times are enabled to be applied for different transactions or different channels for the communication bus.

11. The computer-implemented method of claim 6, further comprising:

determining, by the multiplexer, that the communications for the transaction are ongoing or that the channel is still selected at the deselect time before causing the multiplexer to deselect the channel.

12. The computer-implemented method of claim 6, wherein information for the channel is enabled to be stored to a register of the multiplexer indicating that the channel has been deselected, wherein the multiplexer is prevented from subsequently selecting the channel until the channel has been cleared.

13. The computer-implemented method of claim 6, wherein a host is able to instruct the multiplexer to not apply the deselect time for a specified transaction.

14. A non-transitory computer-readable storage medium including instructions that, when executed by a processor, cause the processor to:

provide, to a multiplexer for a communication bus, a deselect time for a channel corresponding to a device, the deselect time based on a level of risk for at least one of the device or a transaction associated with the device, the deselect time specifying a maximum allowable duration determined for the level of risk, the level of risk based on two or more risk factors;

cause the multiplexer to select the channel to enable communications for the transaction; and enable the multiplexer to automatically deselect the channel, wherein other devices are enabled to communicate over the communication bus using other channels.

15. The non-transitory computer-readable storage medium of claim 14, wherein the communication bus is an inter-integrated circuit (I2C) bus, and wherein the processor, in providing the deselect time, communicates with the multiplexer over the I2C bus.

16. The non-transitory computer-readable storage medium of claim 14, wherein the two or more risk factors include transaction type of the transaction and frequency of selection of the device.

17. The non-transitory computer-readable storage medium of claim 14, wherein the risk factors include at least one of a communication history for the channel, a communication history for the device, a type of the transaction, or whether the device is unpluggable from the communication bus.

18. The non-transitory computer-readable storage medium of claim 14, wherein different deselect times are enabled to be applied for different transactions or different channels for the communication bus.

19. The non-transitory computer-readable storage medium of claim 14, wherein the instructions when executed further cause the processor to:

determine, by the multiplexer, that the communications for the transaction are ongoing or that the channel is still selected at the deselect time before causing the multiplexer to deselect the channel.

20. The non-transitory computer-readable storage medium of claim 14, wherein information for the channel is enabled to be stored to a register of the multiplexer indicating that the channel has been deselected, wherein the multiplexer is prevented from subsequently selecting the channel until the channel has been cleared.

21. An apparatus, comprising:

a data selection component to select channels for a communication bus, wherein the data selection component is further configured to:

receive a deselect time for a channel corresponding to a device, the deselect time based on a level of risk for at least one of the device or a transaction associated with the device, the deselect time specified as a maximum allowable duration determined for the level of risk, the level of risk based on two or more risk factors;

store the deselect time to a local register;

select the channel to enable communications for the transaction; and deselect the channel at the deselect time, wherein other devices are enabled to communicate over the communication bus using other channels as selected by the data selection component.

\* \* \* \* \*